United States Patent [19]

Yamaguchi et al.

[11] Patent Number: 4,742,739
[45] Date of Patent: May 10, 1988

[54] NC LATHE

[75] Inventors: Yoshinori Yamaguchi, Sakuraishi; Hiroshi Yonetani, Narashi; Naoya Tamada, Koriyamashi, all of Japan

[73] Assignee: Kabushiki, Kaisha Moriseiki Seisakusho, Japan

[21] Appl. No.: 902,924

[22] Filed: Sep. 2, 1986

[30] Foreign Application Priority Data

Feb. 17, 1986 [JP] Japan .................. 61-32580

[51] Int. Cl.$^4$ ............................. B23B 17/00
[52] U.S. Cl. ..................... 82/2 D; 82/2.5; 82/32; 82/36 A; 82/28 R
[58] Field of Search ........... 82/2 R, 3, 2.5, 2.7, 82/2 D, 32, 36 A, 28 R; 29/39, 40, 44

[56] References Cited

U.S. PATENT DOCUMENTS

| | | | |
|---|---|---|---|
| 3,459,076 | 8/1969 | Kummer | 29/44 |
| 3,710,466 | 1/1973 | Williamson et al. | 82/36 A |
| 3,726,162 | 4/1973 | Sato | 82/3 |
| 3,918,331 | 11/1975 | Svanstrom | 29/44 |
| 4,161,849 | 7/1979 | Voumard et al. | 82/2.5 |
| 4,404,727 | 9/1983 | Zankl | 82/2.5 |
| 4,457,193 | 7/1984 | Matthey | 82/36 A |
| 4,612,832 | 9/1986 | Ushigoe et al. | 82/36 A |
| 4,622,872 | 11/1986 | Ito | 82/36 A |

FOREIGN PATENT DOCUMENTS

3149779  6/1983  Fed. Rep. of Germany ......... 82/2.5

Primary Examiner—Kuang Y. Lin
Attorney, Agent, or Firm—Antonelli, Terry & Wands

[57] ABSTRACT

An NC lathe comprising a box-shaped bed, a headstock unit and a cutting tool unit each mounted on the bed, a work supplying device provided under the headstock unit, a numerical control unit wherein the bed comprises a first installation surface and two second installation surfaces, the first and second installation surface crossing at right angle to each other, the first installation surface includes a Z-axis and an X-axis crossing at right angle therewith, the headstock unit comprising a headstock reciprocally movable along the Z-axis on the first installation surface, and the cutting tool unit comprising a tool carrier reciprocally movable along the X-axis.

1 Claim, 8 Drawing Sheets

NC LATHE

BACKGROUND OF THE INVENTION

The present invention relates to a numerical or NC lathe and, more particularly, to a NC lathe adapted for robot-manipulation.

A NC lathe has been proposed in order to enable labor-saving and efficient metal-working cutting; however, the proposed NC lathe requires considerable manual intervention since the concept of NC lathes is still based upon a traditional concept that human intervention is required to control a machine. The proposed NC lathe has almost the same mechanism as that of the non-NC lathe; thus, the proposed NC lathe is a mere combination of an ordinary lathe and a numerical control unit. To enable the fullest automatic lathe, it is necessary to develop a special robot manipulatable system; however, a conventional NC lathe is not adapted for robot-manipulation use for a number of reasons.

More particularly, a problem arises in the mounting and removing of workpieces, that is, a large space is required for the robot to work around the lathe freely and such space is commonly designated a three-dimensional manipulatable space. A second problem resides in the fact that a complicated control program is required thereby increasing the overall cost. A third problem resides in the disposal of the cutting chips which is difficult for a robot operator. The undisposed chips often cause difficulties and trouble in the cutting operation.

In an attempt to avoid the above noted problems, in, for example, Japanese patent application No. 60132730 (1985), a NC lathe is proposed which is capable of fully automatic operations from a mounting of a workpiece to a removal of a finished workpiece during which operations the cutting chips are automatically removed.

The aim underlying the present invention essentially resides in providing an improved NC lathe adapted to a robot-manipulability system.

An object of the present invention resides in providing a robot-manipulable NC lathe which reduces the overall operating and labor costs.

Another object of the present invention resides in providing a robot manipulable NC lathe which enhances the efficiency of the cutting of metal work pieces.

A further object of the present invention resides in providing a robot manipulable NC lathe which enables a reduction in the production costs involved in the cutting of metal workpieces.

These and other objects, advantages, and features of the present invention will become more apparent from the following description when taken in conjunction with the accompanying drawings which show, for the purpose of illustration only, one embodiment in accordance with the present invention.

In accordance with advantageous features of the present invention, a NC lathe is provided which includes a box-shaped bed, with a headstock unit mounted on the bed, and a cutting tool unit mounted on the bed. A work supplying device is provided under a main spindle of the headstock unit with a numerical control unit being provided for controlling the headstock unit, the cutting tool unit and the work supplying device.

The bed includes a first insulation surface and two second insulation surfaces, with the first and second insulation surfaces being substantially at right angles with respect to each other. The first installation surface includes a Z-axis and an X-axis crossing at right angles thereto. The headstock unit includes a headstock which is reciprocably movable along the Z-axis on the first installation surface, with means being provided for feeding the headstock. Additionally, means are provided for rotating the main spindle of the headstock unit, with a chuck being provided at a top portion of the main spindle.

Advantageously, in accordance with the present invention, the cutting tool unit includes a tool carrier reciprocably movable along the X-Y axis on the first installation surface, and means for feeding the tool carrier, with a turret head being pivotally connected with the tool carrier in such a manner so as to revolve around the X-axis, and a tool holder fixed to the turret head, as well as an indexing unit for indexing the position of the turret head.

DETAILED DESCRIPTION

Figure 1:
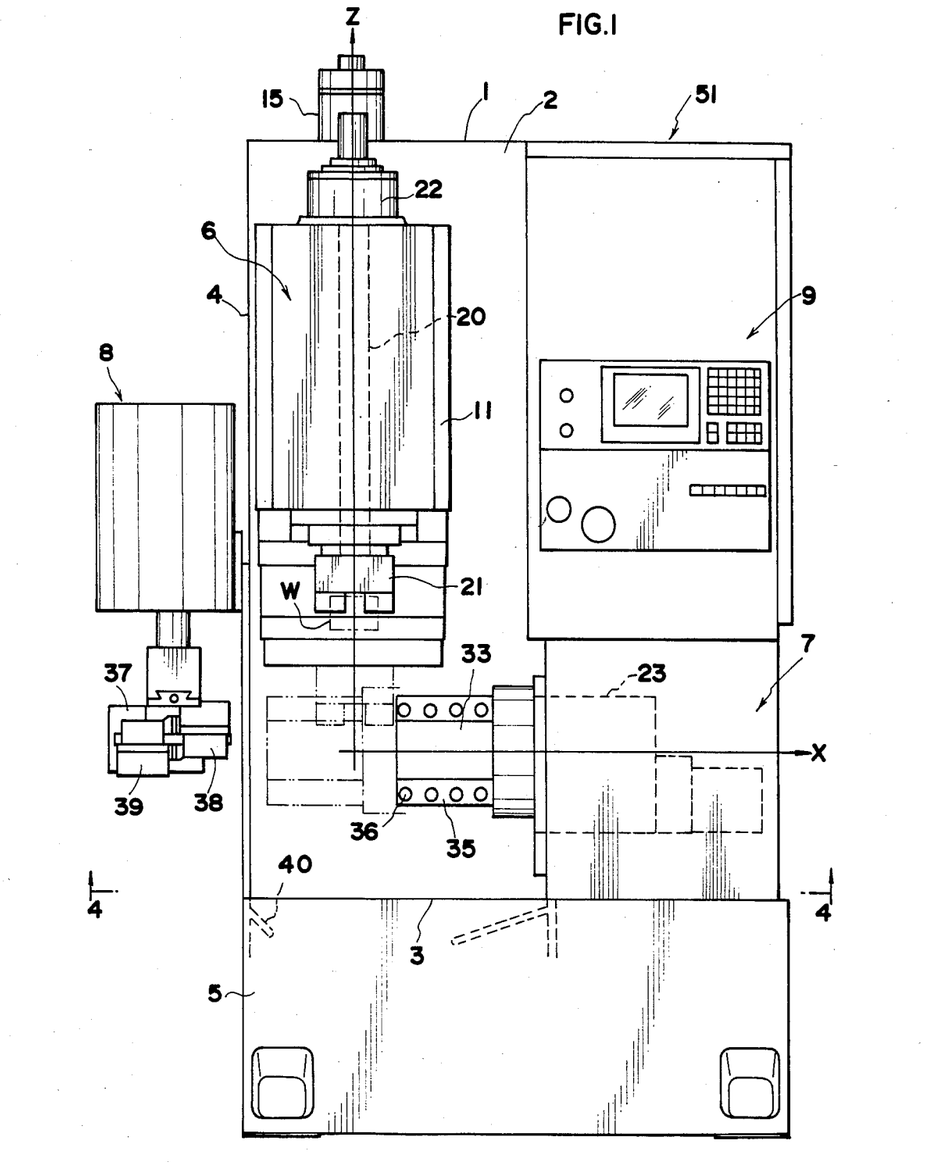
FIG. 1 is a front view showing an NC lathe embodying the present invention.
Figure 5:
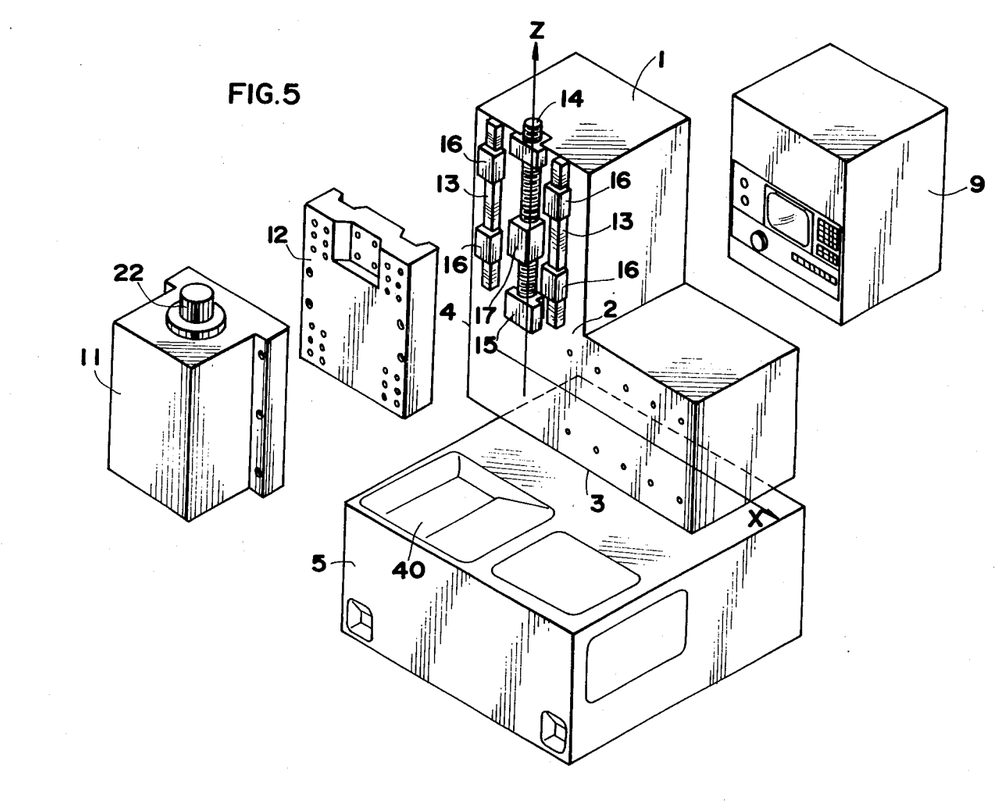
FIG. 5 is an exploded perspective view of a main section of the NC lathe of FIG. 1.

Referring now to the drawings wherein like reference numerals are used throughout the various views to designate like parts and, more particularly, to FIGS. 1 and 5, according to these figures, a numerical control (NC) lathe is provided which includes a bed 1 having an L-shaped box configuration including a front main wall 2 and walls 3, 4 adjacent to each other, with each wall 3, 4 being disposed at substantially a right angle to the main wall 2. The Z-axis and the X-axis are provided along the main wall 2, with the Z-axis providing a reference plane for a location of a headstock unit 6 and the X-axis providing a reference plane for locating a cutting tool unit 7, with Z-axis and X-axis being at right angles to each other.

As shown in FIG. 1, the bed 1 is mounted on a base 5, with the wall 3 being a foundation plane, and the Z-axis extending in a vertical direction, which means that the lathe illustrated in FIG. 1 is a vertical type lathe.

The headstock unit generally designated by the reference numeral 6 and the tool unit generally designated by the reference numeral 7 are mounted on the main wall 2 of the bed 1, and a work supplying device generally designated by the reference numeral 8 is mounted on the wall 4. The bed 1 includes a recess having a long side and a short side of the L-shaped configured body. A numerical control (NC) unit generally designated by the reference numeral 9 is provided for controlling the headstock unit 6, the tool unit 7 and the workpiece supplying device 8.

Figure 2:
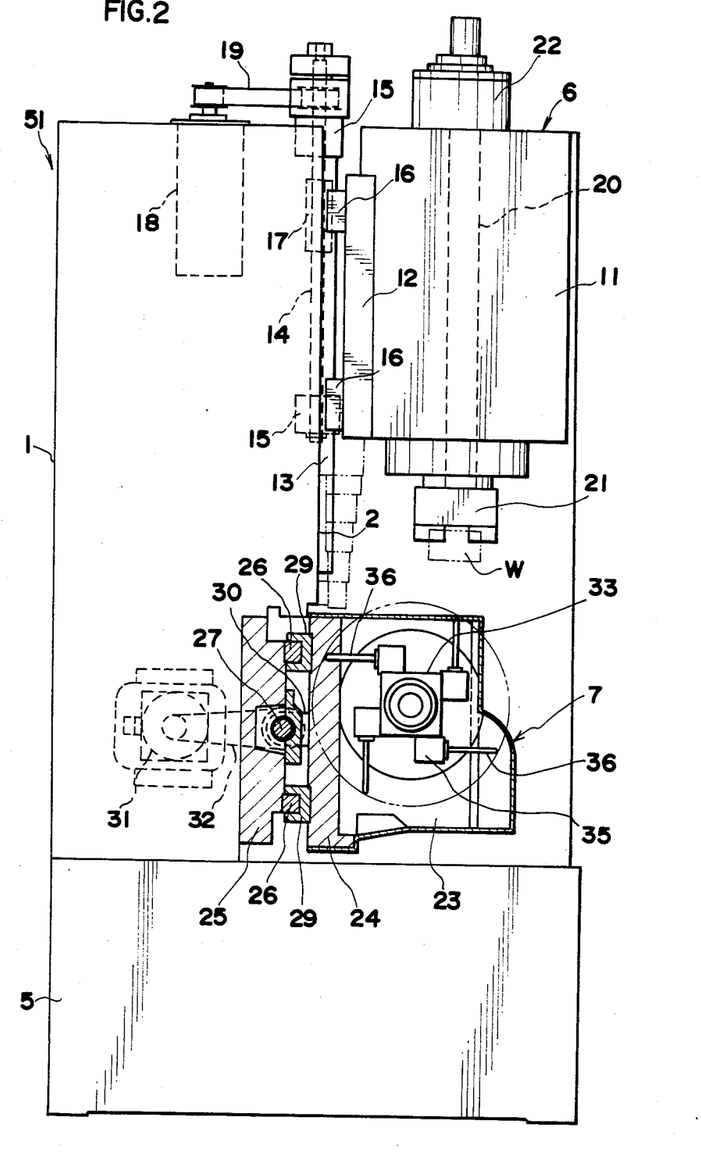
FIG. 2 is a left-side vertical cross-section.
Figure 3:
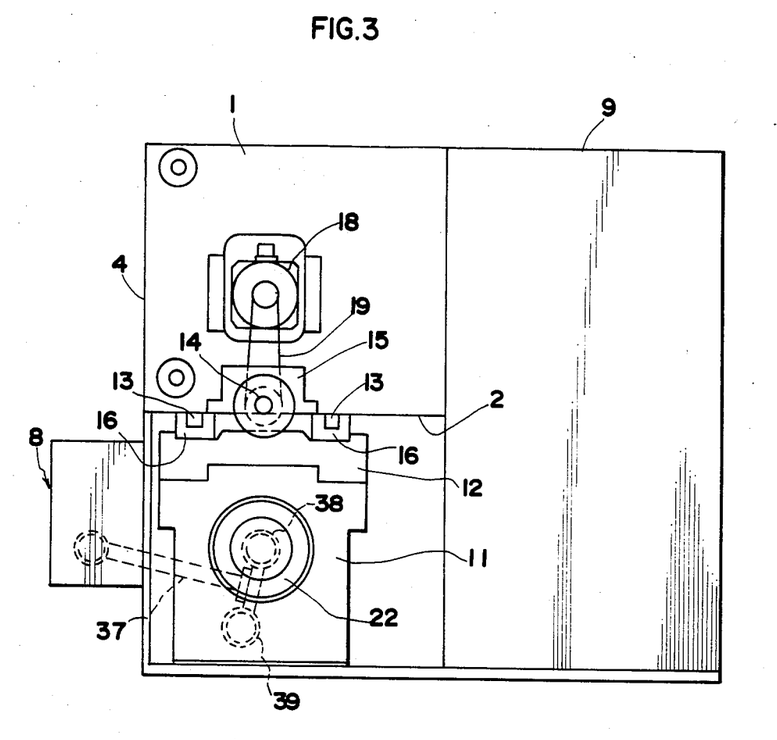
FIG. 3 is a plan view of the NC lathe of FIG. 1.

As shown in FIG. 2, the headstock unit 6 includes a headstock 11 slidable along the Z-axis on the main wall 2 by a carrier 12. Two linear guides 13 are provided on the main wall 2 and are disposed in parallel to the Z-axis, with a feed screw being rotatably interposed therebetween through bearings 15. The carrier 12 is fixed to bearings 16 of the linear guides 13, and a nut is fixed to the feed screw 14, so that it can reciprocably move along the Z-axis in accordance with the rotation of the feed screw 14 which is adapted to be rotated in a clockwise and counterclockwise direction by a servomotor 18 (FIGS. 2 and 3) through a belt transmission 19.

The headstock 11 includes a motor (not shown) for driving the main spindle 20 extending along the Z-axis. The main spindle 20 is provided with an automatic chuck 21 in its top portion, the automatic chuck 21, directed in a downward direction, includes a driving device 22 for opening and closing the chuck 21 located above the headstock 11.

The tool unit 7 includes a tool holder 23 carried on an X-axis carrier 24, which is slidable along the X-axis on the main wall 2. An X-axis base 25 is fixed to the main wall 2, and two linear guides 26 are provided on the X-axis base 25 in parallel with the X-axis, with a feed screw 27 being interposed therebetween through bearings 28. The X-axis carrier 24 is fixed to the linear guides 26 through bearings 29, and a nut 30 of the feed screw 27. The carrier 24 moves in a forward and rearward direction along the X-axis in accordance with the rotation of the feed screw 27. The feed screw 27 is rotated in the clockwise and counterclockwise directions by a servomotor 31 located in the lower section of the bed 1 (FIGS. 2 and 4) through a belt transmission 32.

Figure 6:
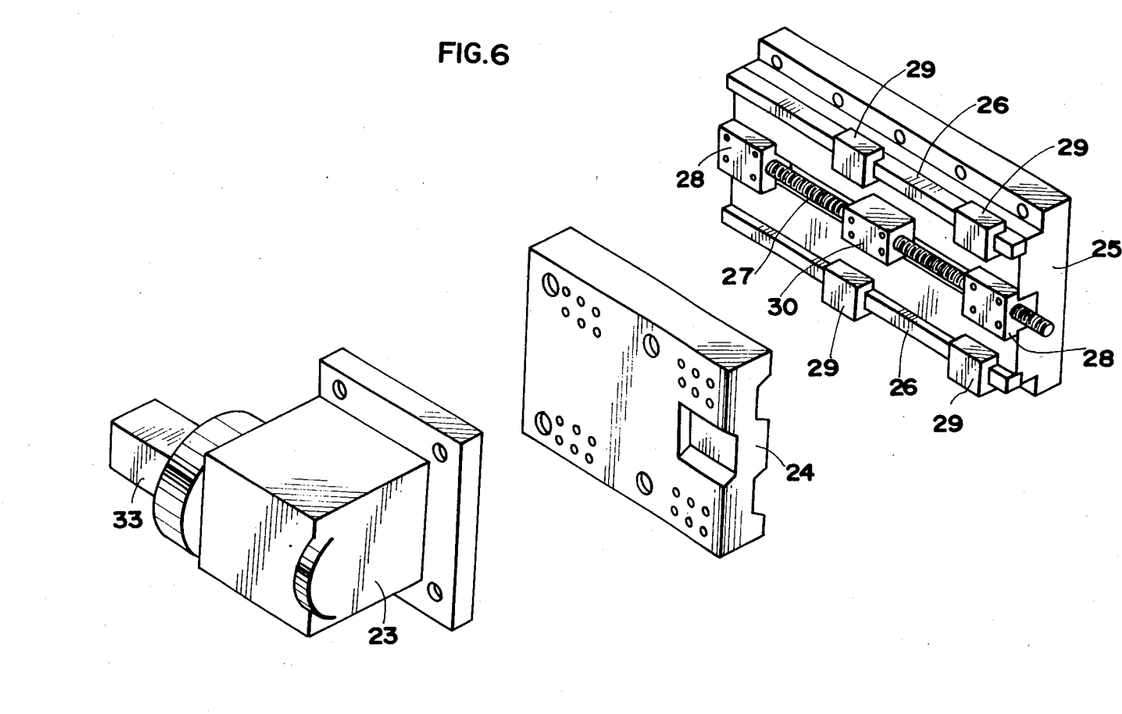
FIG. 6 is an exploded view of the tool unit of the NC lathe of FIG. 1.

The tool holder 23 includes a turret head 33 revolving around the axis, and the turret head 33 includes a comb-like holder 35 on which a plurality of tools 36 are mounted. The tool holder 23 includes an index head (not shown) which enables the turret head 33 to rotate 90° increments.

The work supplying device 8 includes a swinging arm 37 swingeable in a horizontal plane, with the arm 37 including work holders 38, 39 at opposite end portions thereof.

The numerical control unit 9 controls the headstock 11, the tool holder 23 and the work supplying device 8; the speed of rotation of the main spindle 20; the opening and closing of the automatic chuck 21, and the 90-angular displacement of the turret head 33. An inlet port 40 is provided for receiving cutting chips, with a workpiece (W) being supplied under the main spindle 20 by the swinging arm 37, and caught by the chuck 21 as the headstock 11 descends along the Z-axis. The rotation of the main spindle 20 causes the workpiece (W) to rotate, and the headstock 11 is caused to move in the Z-axis direction, and the tool holder 23 is caused to move in the X-axis direction. In this way the work piece (W) is cut by the cutting tool 36 whose position is previously determined so as to locate the same with respect to the workpiece (W). The cutting chips fall into the inlet port 40 by gravity for collection. At this stage the workpiece (W) is held with its head in a downward position, thereby avoiding any entanglement with the cutting chips. The cutting chips adhering to the cutting tool 36 fall off during an indexing operation.

Figure 4:
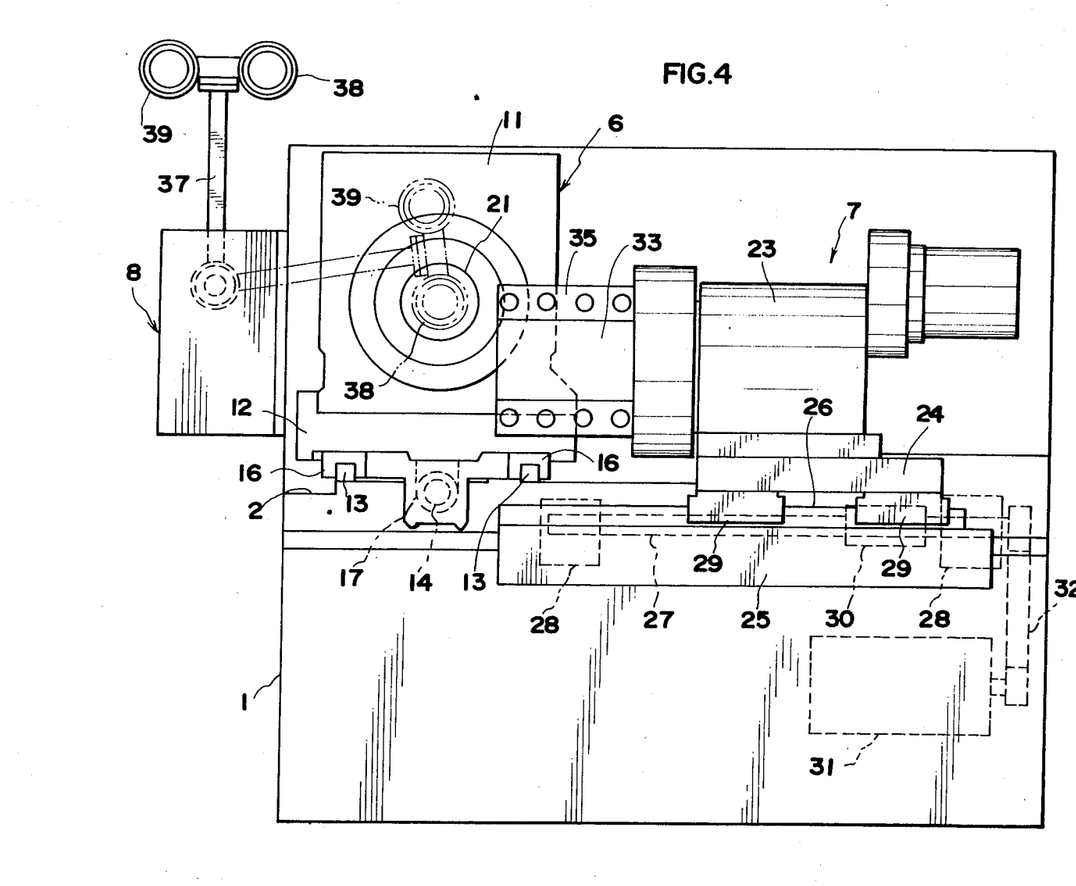
FIG. 4 is a cutaway bottom view taken along the line 4—4 in FIG. 1.

When the cutting workpiece is finished for one work, the swinging arm 37 moves to the position indicated in phantom lines in FIG. 4. The finished workpiece is released from the chuck 21, and accepted by the holders 38. The swinging arm 37 further rotates, so that the finished workpiece (W), held by the holders 39, is placed in place under the main spindle 20 and the procedure is subsequently repeated.

Figure 7:
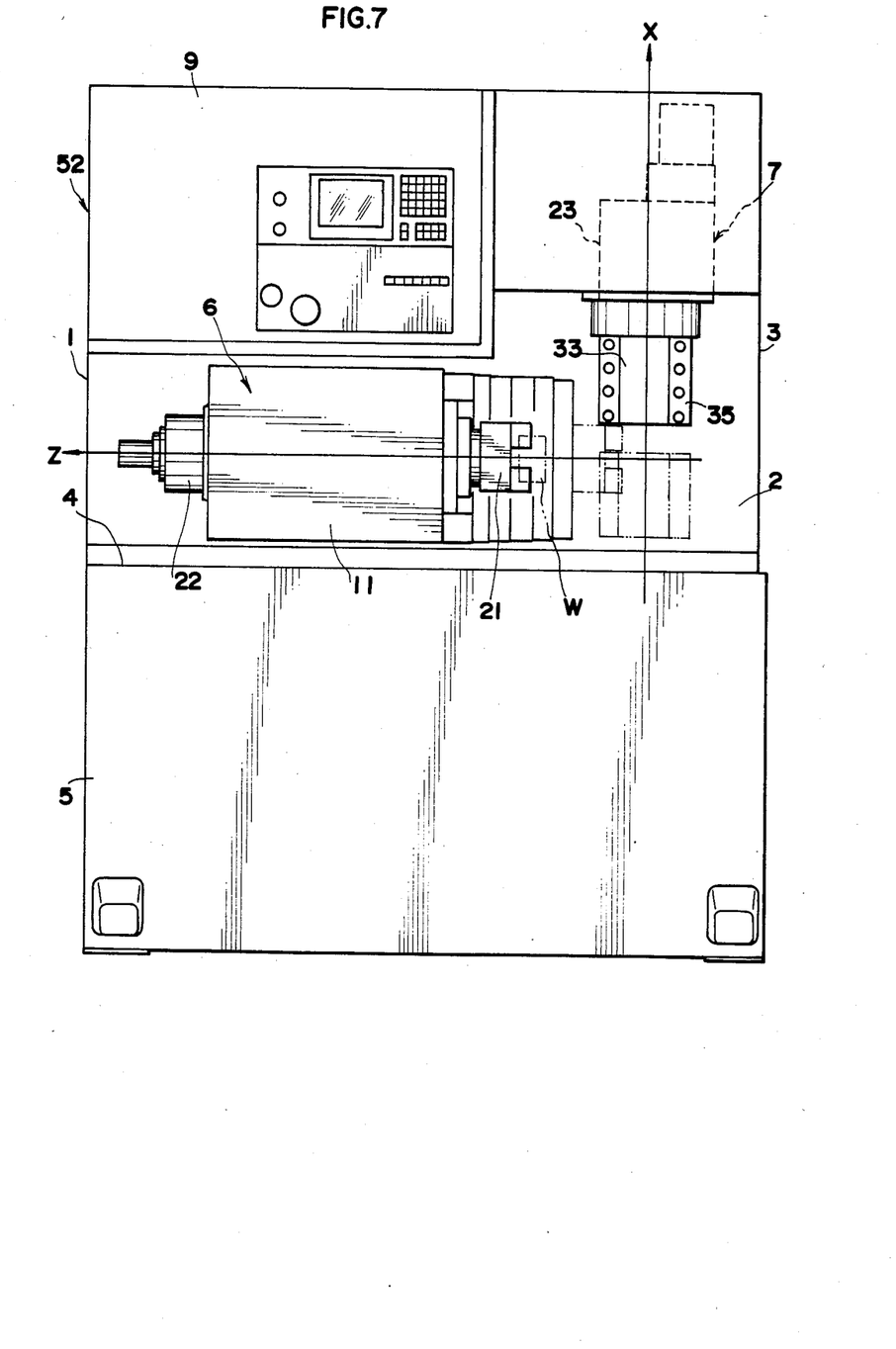
FIG. 7 is a front view of a modification to the present invention.

In contrast to the vertical type NC lathe described above, FIG. 7 shows a horizontal type lathe, characterised in that the bed 1 is mounted on the base 5 with the wall 4 as the foundation plane, and with the Z-axis arranged horizontally. The work supplying device 8 is provided on the wall 3 (not shown).

Figure 8A:
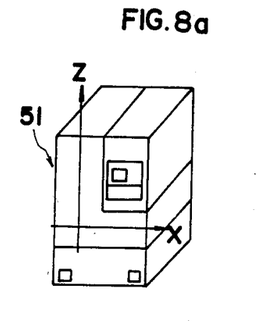
FIGS. 8a–8c are schematic views of an operation of the present invention with a vertical type NC lathe.
Figure 8B:
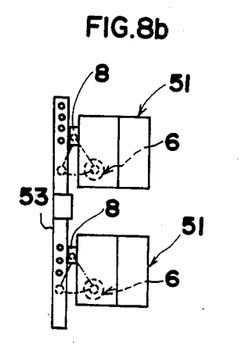
Figure 8C:
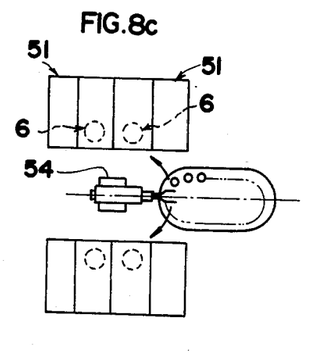

FIGS. 8a–8c illustrate various forms of operation under a vertical type of NC lathes embodying the present invention with FIG. 8b illustrating two lathes 51 are arranged side by side so that a workpiece (W) is cut by one lathe, and the finished workpiece is transported to the other by a conveyor 53. FIG. 8(c) illustrates an arrangement wherein several lathes 51 are arranged with robots 54 interposed in between each one and the other which transfer the work from one lathe 51 to another.

Figure 9A:
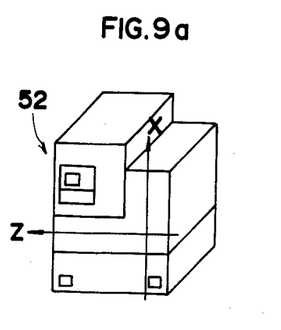
FIGS. 9a–9c are schematic views of the operation of the present invention with a horizontal type NC lathe.
Figure 9B:
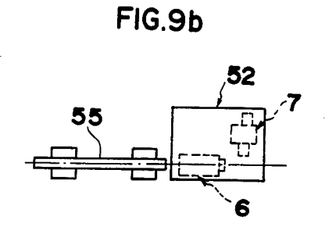
Figure 9C:
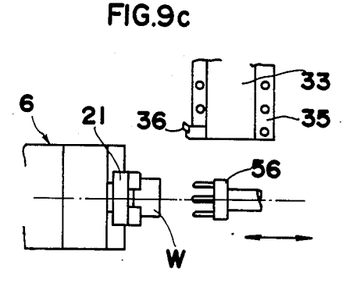

FIGS. 9a–9b illustrate various forms of operation with a horizontal type lathe generally designated by the reference numeral 52 embodying the present invention, with FIG. 9b illustrating an arrangement wherein a bar is cut while being intermittently fed by a predetermined length through the main spindle 20 in the Z-axis direction by a feeder 55. FIG. 9c illustrates an arrangement wherein the workpiece (W) is held by the chuck 21 and is processed by a tool 56 which is disposed in opposition to the main spindle 2.

An example of the operation will be described first with reference to a vertical type in which the bed 1 arranged so that the Z-axis extends in a vertical direction:

The workpiece (W) is supplied under the main spindle 20 by the supplying device 8, wherein the workpiece is held by the chuck 21 in a suspended posture. As the main spindle 20 is rotated, the workpiece (W) is caused to revolve about its own axis. At this stage the headstock 11 moves in the Z-axis, and the tool carrier 23 moves in the X-axis; during these movements the workpiece (W) is cut. The cutting chips are allowed to fall by gravity for collection. The work supplying device 8 moves again so as to transport the finished workpiece (W) outside, and take in a fresh workpiece (W) under the main spindle 20. As described above the tool carrier has a turret head in which a plurality of tools are mounted and work without interference.

Another example of operation will be described with reference to a horizontal type of NC lathe in which the bed 1 is arranged along the Z-axis extending in a horizontal direction. Herein the headstock 11 and the main spindle 20 move in a horizontal direction. This arrangement is adapted for use in cutting lengthy works, such as rods, in which the workpiece (W) is intermittently transferred by constant lengths or in which a special tool, such as a drill head, is provided ahead of the main spindle 20 in the Z-axis direction. It is possible to combine a plurality of vertical type of lathes, or a plurality of horizontal type of lathes. The transfer of workpieces (W) from one lathe 51 to another is effected by the respective work supplying devices and special transfer devices, and when necessary, with the addition of a robot.

According to the present invention many advantages results: one is the simplicity in assembling because of the fact that each component sections, such as the bed 1, tool carrier, work supplying device 8 and NC lathe 51, is made as a self-contained unit. Each unit can be mass-produced, thereby reducing the production cost, and can be stored as stocks, thereby meeting the users' demand at any time. A vertical type and a horizontal type are instantly changeable, because of the fact that the bed 1 has one main installation surface 2 and two installation surfaces 3, 4 for allowing the headstock unit 6 and the tool unit 7 to be mounted thereon. This readily changeable structure facilitates various forms of operation. Particularly when the vertical type is employed the work is suspended in a downward position, thereby allowing cutting chips to fall off the work by gravity, with the falling cutting chips are ready for collection.

Under the present invention a plurality of lathes 51 are used in combination, thereby securing various forms of operation with respect to workpieces employing human intervention since the NC lathe of the present invention can be operated by a robot.

What is claimed is:
1. As follows:
A numerical control lathe comprising:
a box-shaped bed;
a headstock mounted on the bed;
a cutting tool unit mounted on the bed;
a workpiece supplying device provided under a main spindle of the headstock unit;
a numerical control unit for controlling the headstock unit, the cutting tool unit and the workpiece supplying device;
wherein the bed comprises a first installation surface and two second installation surfaces;
wherein the first and second installation surfaces are disposed substantially at a right angle to each other, the first installation surface includes a Z-axis and an X-axis crossing at right angle therewith;
wherein the headstock unit comprises a headstock reciprocably movable along the Z-axis on the first installation surface, means for feeding the headstock, means for rotating the main spindle of the headstock unit, and a chuck provided at a top portion of the main spindle; and
wherein the cutting tool unit comprises a tool carrier reciprocably movable along the X-axis on the first installation surface, means for feeding the tool carrier, a turret head pivotally connected to the tool carrier in such a manner so as to enable a revolution around the X-axis, a tool holder fixed to the turret head, and an indexing unit for indexing a position of the turret heat.

* * * * *